United States Patent
White et al.

(10) Patent No.: US 11,415,023 B2
(45) Date of Patent: Aug. 16, 2022

(54) GAS TURBINE ENGINE AND OIL SYSTEM THEREOF

(71) Applicant: ROLLS-ROYCE plc, London (GB)

(72) Inventors: Samuel W. White, Derby (GB); William A. Malewicz, Derby (GB); Sebastian Ray, Derby (GB); Cristina Diaz Garcia, Derby (GB)

(73) Assignee: ROLLS-ROYCE PLC, London (GB)

( * ) Notice: Subject to any disclaimer, the term of this patent is extended or adjusted under 35 U.S.C. 154(b) by 905 days.

(21) Appl. No.: 16/291,019

(22) Filed: Mar. 4, 2019

(65) Prior Publication Data
US 2020/0025033 A1    Jan. 23, 2020

(30) Foreign Application Priority Data
Mar. 22, 2018    (GB) ...................................... 1804579

(51) Int. Cl.
  *F01D 25/20*    (2006.01)
  *F01M 11/04*    (2006.01)
  *F02C 7/32*    (2006.01)

(52) U.S. Cl.
  CPC ......... *F01D 25/20* (2013.01); *F01M 11/0458* (2013.01); *F01M 2011/0466* (2013.01);
  (Continued)

(58) Field of Classification Search
  CPC .............. F01D 25/20; F01M 11/0458; F01M 2011/0466; F02C 7/32; F02C 7/06;
  (Continued)

(56) References Cited

U.S. PATENT DOCUMENTS

2010/0326048 A1    12/2010  Lozier et al.
2013/0291514 A1    11/2013  Suciu et al.
(Continued)

FOREIGN PATENT DOCUMENTS

DE    10 2011 112 254 A1    3/2013
DE       102011112254 A1  *  3/2013    ........... F01D 25/125

OTHER PUBLICATIONS

Great Britain search report dated Sep. 19, 2018, issued in GB Patent Application No. 1804579.9.
(Continued)

*Primary Examiner* — Jacob M Amick
*Assistant Examiner* — Charles J Brauch
(74) *Attorney, Agent, or Firm* — Crowell & Moring LLP

(57) ABSTRACT

A gas turbine engine for an aircraft comprises: an engine core comprising a turbine, a compressor, and a core shaft connecting the turbine to the compressor. The gas turbine engine further comprises a core casing surrounding the engine core. The gas turbine engine further comprises a core cowl surrounding the engine core and the core casing. The gas turbine engine further comprises an engine accessory gearbox driven by a take-off from the core shaft. The gas turbine engine further comprises an oil system having one or more oil pumps powered by the engine accessory gearbox for circulating lubricating oil around components of the engine including the engine accessory gearbox, and having an oil tank for receiving and storing oil scavenged from the engine components before recirculation thereto. The gas turbine engine further comprises an oil fill line which extends from the engine accessory gearbox to an inlet port accessible from the core cowl, the oil tank being fillable from the inlet port via the fill line and the engine accessory gearbox.

11 Claims, 3 Drawing Sheets

(52) U.S. Cl.
CPC ............ *F02C 7/32* (2013.01); *F05D 2230/72* (2013.01); *F05D 2250/30* (2013.01)

(58) Field of Classification Search
CPC .......... F02C 7/00; F02C 7/12; F05D 2230/72; F05D 2250/30; F05D 2260/85; F05D 2260/98; F16N 2210/02; Y02T 50/60
See application file for complete search history.

(56) References Cited

U.S. PATENT DOCUMENTS

| | | |
|---|---|---|
| 2014/0010639 A1 | 1/2014 | Snape et al. |
| 2014/0231437 A1 | 8/2014 | Snyder et al. |
| 2015/0075132 A1 | 3/2015 | Kohn et al. |
| 2017/0314474 A1 | 11/2017 | Wotzak |

OTHER PUBLICATIONS

Extended European Search Report, issued in EP Application No. 19162252.1, dated Jul. 25, 2019, pp. 1-6, European Patent Office, Munich, Germany.

\* cited by examiner

GAS TURBINE ENGINE AND OIL SYSTEM THEREOF

CROSS-REFERENCE TO RELATED APPLICATIONS

This specification is based upon and claims the benefit of priority from UK Patent Application Number GB 1804579.9 filed on Mar. 22, 2018, the entire contents of which are incorporated herein by reference.

BACKGROUND

Technical Field

The present disclosure relates to a gas turbine engine and an oil system thereof.

Description of the Related Art

Modern gas turbine engines generally comprise one or more shafts, each connecting a compressor and a turbine of a respective stage. The shafts are journaled by a series of bearing assemblies. These are cooled and lubricated by means of an oil system which provides a circulating flow of lubricating oil around the bearing assemblies and other components of the engine. The oil system also includes an oil scavenging system for recovering used oil from the various locations in the engine and discharging the recovered used oil into an oil tank, from where it can be pumped back around the system.

Conventionally, the oil tank of a turbofan gas turbine engine is located at the front of the engine on the fan case. Filling of the oil system is accomplished via the oil tank. For example, the oil tank can have a filling port at an upper side thereof which is accessible through the fan cowl (i.e. nacelle) of the engine. A maintenance engineer in an elevated position (e.g. on a ladder) can fill the system simply by pouring oil into the tank via the port. A sight glass on the side of the tank can provide the maintenance engineer with an indication of how much oil is in the system.

A problem arises, however, when the tank is positioned in a more remote location of the engine, such that it cannot be so readily accessed for filling. For example, the tank may be mounted to the core engine rather than the fan case. Further disadvantages of the conventional approach to oil tank filling are that it is possible for an oil cap of the filling port to be left off after filling and that oil is easy to spill during filling which can leave residue inside the fan cowl.

SUMMARY

The present disclosure provides a gas turbine engine as set out in the appended claims.

The present disclosure provides a gas turbine engine for an aircraft comprising:

an engine core comprising a turbine, a compressor, and a core shaft connecting the turbine to the compressor;

a core casing surrounding the engine core;

a core cowl providing an aerodynamic fairing which surrounds the engine core and the core casing;

an engine accessory gearbox driven by a take-off from the core shaft, and mounted between the core casing and the core cowl; and an oil system having one or more oil pumps powered by the engine accessory gearbox for circulating lubricating oil around components of the engine including the engine accessory gearbox, and having an oil tank for receiving and storing oil scavenged from the engine components before recirculation thereto;

wherein the engine accessory gearbox and the oil tank are mounted between the core casing and the core cowl, with the oil tank being located forward of the engine accessory gearbox; and wherein the gas turbine engine further comprises an oil fill line which extends from the engine accessory gearbox to an inlet port accessible from the core cowl, the oil tank being fillable from the inlet port via the fill line and the engine accessory gearbox.

Advantageously, by filling the oil tank via the fill line and the engine accessory gearbox, the inlet port can be positioned at a convenient and safe location on the engine, even when the oil tank itself is positioned in a relatively inaccessible location.

Optional features of the present disclosure will now be set out. These are applicable singly or in any combination with any aspect of the present disclosure.

The engine accessory gearbox may be mounted vertically beneath the core casing.

The oil tank may extend circumferentially around the core casing from bottom dead centre to top dead centre.

The inlet port may be accessible from the core cowl at a location rearward of the engine accessory gearbox.

The gas turbine engine may further comprise: a fan located upstream of the engine core, the fan comprising a plurality of fan blades; an annular fan duct extending rearwardly from the fan for a flow of air bypassing the engine core; and a fan cowl surrounding the annular fan duct and defining an exit for the bypass air flow form the fan duct. The inlet port can then be rearward of the bypass air exit from the fan cowl, and hence unobstructed by fan cowl.

In the present application, "front" and "rear" are with respect to the gas turbine engine, i.e. the fan being in the front and the exit for the bypass air flow being in the rear. Moreover, "upstream" and "downstream" are with respect to the axial flow of air through the gas turbine engine.

The gas turbine engine may further comprise respective oil level sensors in the engine accessory gearbox and the oil tank for determining the amount of oil in the oil system. In this way, even if a sight glass is not available on the oil tank, it is possible to determine the amount of oil in the oil system, e.g. by way of display based on the sensor readings and provided to a maintenance engineer.

Conveniently, the gas turbine may be configured such that oil from the fill line collects in the engine accessory gearbox and is pumped to the oil tank from the engine accessory gearbox on engine startup. For example, the oil collected in the engine accessory gearbox may be pumped to the oil tank via a scavenge line connecting the engine accessory gearbox and the oil tank on engine startup.

Additionally or alternatively, the gas turbine may be configured such that the oil tank is fillable by injecting pressurised oil at the inlet port. This allows the oil tank to be filled to a level above the vertical height of the inlet port.

The turbine may be a first turbine, the compressor may be a first compressor, and the core shaft may be a first core shaft, and the engine core may further comprise a second turbine, a second compressor, and a second core shaft connecting the second turbine to the second compressor. In this case, the second core shaft may be arranged to rotate at a different rotational speed than the first core shaft.

Arrangements of the present disclosure may be particularly, although not exclusively, beneficial for fans that are driven via a power gearbox. Accordingly, the gas turbine engine may comprise a power gearbox that receives an input from the core shaft and outputs drive to the fan so as to drive the fan at a lower rotational speed than the core shaft. The input to the power gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The power gearbox may be arranged to be driven by the core shaft that is configured to rotate (for example in use) at the lowest rotational speed (for example the first core shaft in the example above). For example, the power gearbox may be arranged to be driven only by the core shaft that is configured to rotate (for example in use) at the lowest rotational speed (for example only be the first core shaft, and not the second core shaft, in the example above). Alternatively, the power gearbox may be arranged to be driven by any one or more shafts, for example the first and/or second shafts in the example above.

The power gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. A higher gear ratio may be more suited to "planetary" style gearbox. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
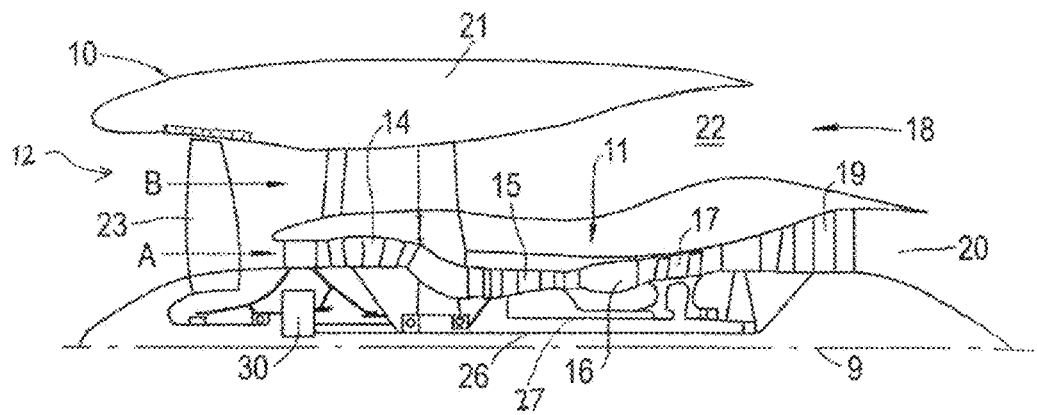
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle (i.e. fan cowl) 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic power gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
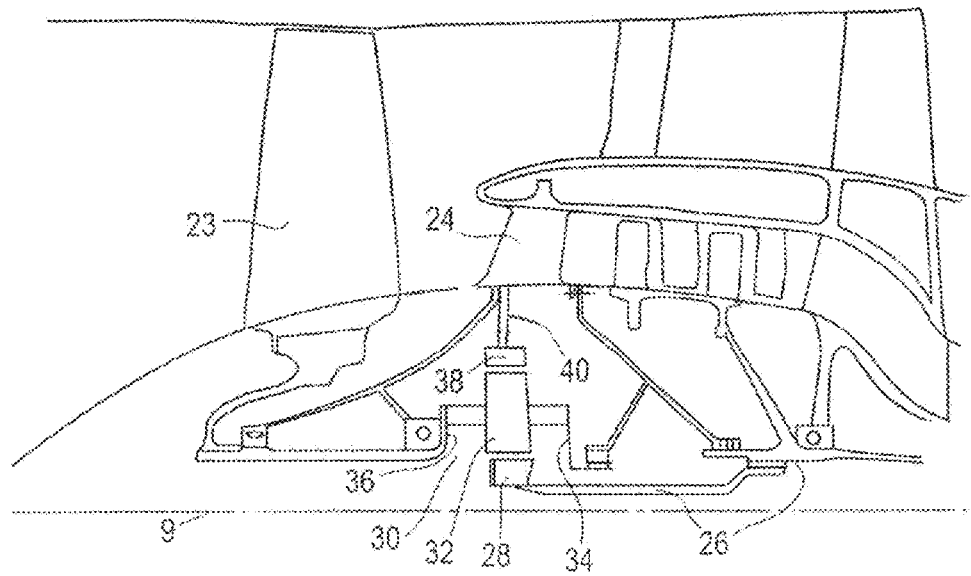
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the power gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
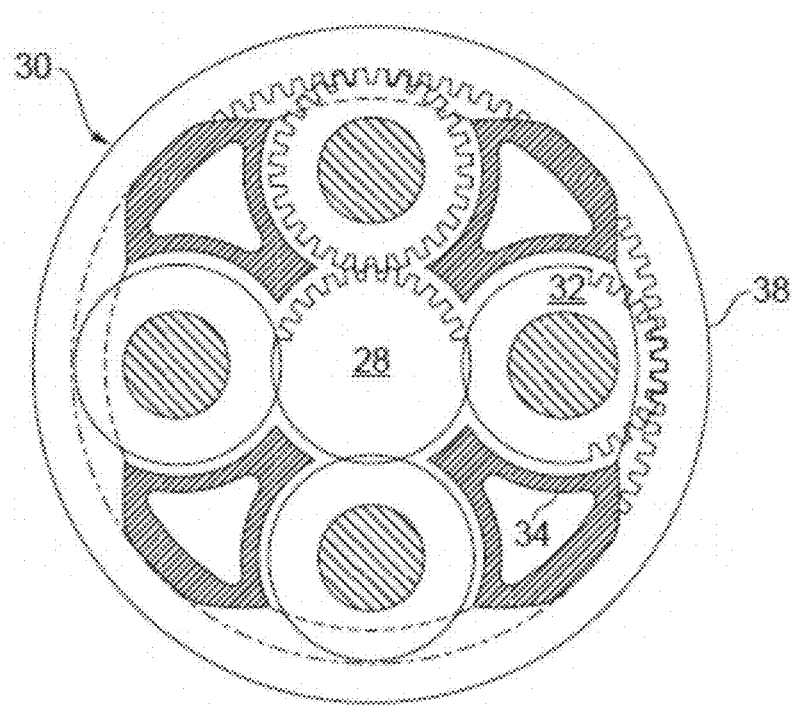
FIG. 3 is a partially cut-away view of a power gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the present disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the power gearbox 30 in the engine 10 and/or for connecting the power gearbox 30 to the engine 10. By way of further example, the connections (such as the linkages 36, 40 in the FIG. 2 example) between the power gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the power gearbox and the fixed structures, such as the power gearbox casing) may be used, and the disclosure is not limited to the exemplary arrangement of FIG. 2. For example, where the power gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of power gearbox styles (for example star or planetary), support structures, input and output shaft arrangement, and bearing locations.

Optionally, the power gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
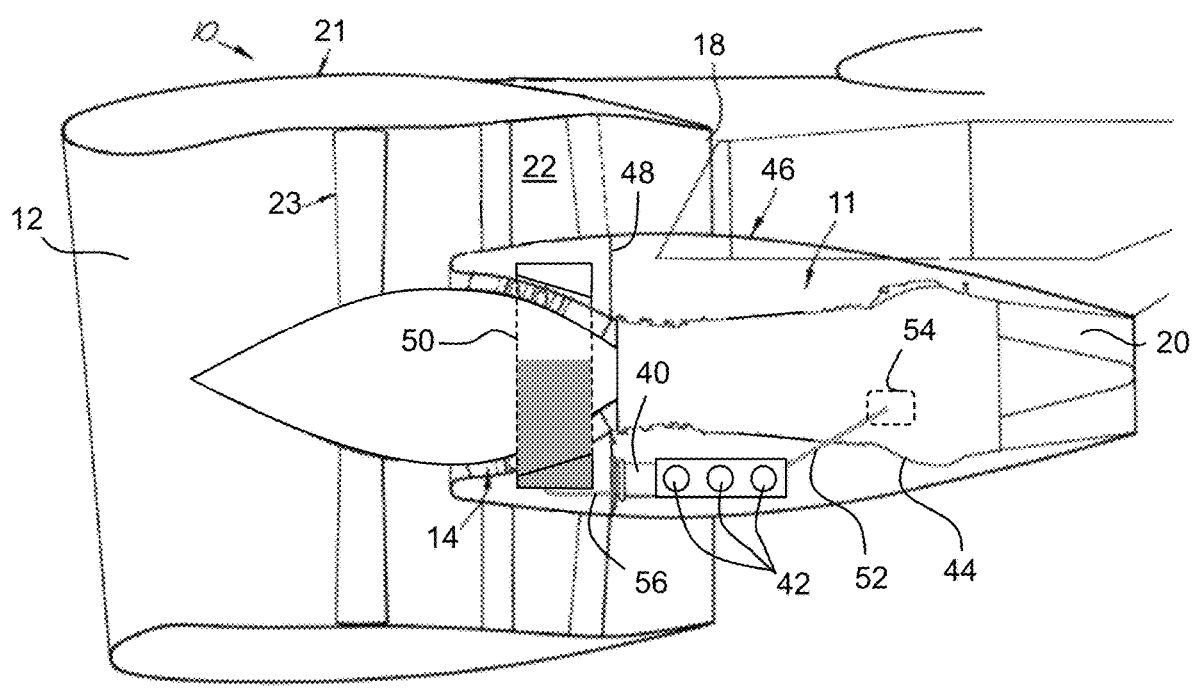
FIG. 4 shows schematically another sectional side view of the gas turbine engine.

FIG. 4 shows schematically another sectional side view of the gas turbine engine 10. A first engine zone is bounded on a radially inner side by a core casing 44 of the engine core 11, on a radially outer side by a core cowl 46 which forms an aerodynamic inner wall of the bypass duct 22, and on a forward side by a fire wall 48. Within the zone, an accessory gearbox 40 driven by a take-off (such as a radial drive shaft) from the core shaft 26 is mounted adjacent to and vertically beneath the core casing, along with other accessories 42 driven by the gearbox 40. The other accessories 42 may include any one or more of a power generator, fuel pump, oil pumps, a hydraulic pump, and an engine starter motor.

The engine 10 has an oil system which circulates oil to engine components such as bearings, gears, seals and splines. The oil system includes an oil tank 50 which provides a reservoir of oil (indicated in grey in FIG. 4) to supply the oil system, and a destination for scavenged oil. The oil tank 50 is located in a second engine zone between the core casing 44 and the core cowl 46, and forward of the fire wall 48. At this location it wraps around the engine core 11 from bottom to top dead centre.

The oil tank 50 is within the axial extent of the fan cowl 21, and is thus relatively inaccessible for replenishment by a maintenance engineer. Accordingly, the filling arrangement for the oil tank 50 proceeds via the accessory gearbox 40. In particular, the oil system includes a fill line 52 which extends from the engine accessory gearbox 40 to an inlet port accessible from through a hatch 54 in the core cowl 46. The inlet port and hatch 54 are rearward of the bypass air exit from the fan cowl 21, and are thus unobstructed by the fan cowl. Oil collected in the engine accessory gearbox 40 by this arrangement is then directed to the oil tank 50 through a further line, such as a scavenge line 56 from the engine accessory gearbox. Sensors (not shown) in the accessory gearbox 40 and the oil tank 50 provide indications of the respective oil levels in these components, and thus the total amount of oil in the system.

The procedure for replenishing the system with oil can then be as follows:
1. The maintenance engineer approaches the engine with a standard can of oil.
2. The engineer opens the hatch 54 in the core cowl 46.
3. The engineer releases a filling cap closing the inlet port and pours in oil from the can.
4. Aircraft power is used to power the sensors in the accessory gearbox 40 and the oil tank 50 to give an overall level of the oil in the system.
5. A display can be provided to the engineer showing the current level so that the engineer can stop pouring when the system is at the required level.

At engine shutdown the accessory gearbox 40 contains only a small amount of oil. Thus the oil supplied through the inlet port and fill line 52 collects by gravity in the spare space provided by the accessory gearbox 40. On engine start up, this oil is drawn through the scavenge line 56 into the oil tank 50 by the operation of the oil pumps.

Another option, however, is to use a pressure filling system, so that the supplied oil is sent to the oil tank 50 at the time of filling. This can allow a larger quantity of oil to be supplied to the oil tank 50 than would otherwise be the case, i.e. to a level above the vertical height of the inlet port. For example, a conventional oil pump can be used by the maintenance engineer to pump oil into through the inlet port. In this case, the inlet port can have a self-sealing closing arrangement to prevent oil back flow.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine for an aircraft comprising:
an engine core comprising a turbine, a compressor, and a core shaft connecting the turbine to the compressor;
a core casing surrounding the engine core;
a core cowl providing an aerodynamic fairing which surrounds the engine core and the core casing;
an engine accessory gearbox driven by a take-off from the core shaft, and mounted between the core casing and the core cowl; and
an oil system having one or more oil pumps powered by the engine accessory gearbox for circulating lubricating oil around components of the engine including the engine accessory gearbox, and having an oil tank for receiving and storing oil scavenged from the engine components before recirculation thereto;
wherein the engine accessory gearbox and the oil tank are mounted between the core casing and the core cowl, with the oil tank being located forward of the engine accessory gearbox; and
wherein the gas turbine engine further comprises an oil fill line which extends from the engine accessory gearbox to an inlet port accessible from the core cowl, the oil tank being fillable from the inlet port via the fill line and the engine accessory gearbox.

2. The gas turbine engine according to claim 1, wherein the engine accessory gearbox is mounted vertically beneath the core casing.

3. The gas turbine engine according to claim 1, wherein the oil tank extends circumferentially around the core casing from bottom dead centre to top dead centre.

4. The gas turbine engine according to claim 1, wherein the inlet port is accessible from the core cowl at a location rearward of the engine accessory gearbox.

5. The gas turbine engine according to claim 1 comprising:
a fan located upstream of the engine core, the fan comprising a plurality of fan blades;
an annular fan duct extending rearwardly from the fan for a flow of air bypassing the engine core; and
a fan cowl surrounding the annular fan duct and defining an exit for the bypass air flow form the fan duct;
wherein the inlet port is rearward of the bypass air exit from the fan cowl.

6. The gas turbine engine according to claim 1 further comprising:
a power gearbox that receives an input from the core shaft and outputs drive to the fan so as to drive the fan at a lower rotational speed than the core shaft.

7. The gas turbine engine according to claim 1 further comprising respective oil level sensors in the engine accessory gearbox and the oil tank for determining the amount of oil in the oil system.

8. The gas turbine engine according to claim 1 which is configured such that oil from the fill line collects in the engine accessory gearbox and is pumped to the oil tank from the engine accessory gearbox on engine startup.

9. The gas turbine engine according to claim 8, wherein the oil collected in the engine accessory gearbox is pumped to the oil tank via a scavenge line connecting the engine accessory gearbox and the oil tank on engine startup.

10. The gas turbine engine according to claim 1 which is configured such that the oil tank is fillable by injecting pressurised oil at the inlet port.

11. The gas turbine engine according to claim 1, wherein:
the turbine is a first turbine, the compressor is a first compressor, and the core shaft is a first core shaft;
the engine core further comprises a second turbine, a second compressor, and a second core shaft connecting the second turbine to the second compressor; and
the second core shaft is arranged to rotate at a different rotational speed than the first core shaft.

* * * * *